United States Patent [19]
Tiberend

[11] Patent Number: 4,521,997
[45] Date of Patent: Jun. 11, 1985

[54] HAY BALE COVER

[76] Inventor: Harvey L. Tiberend, R.R. #1, Box 97, O'Fallon, Ill. 62269

[21] Appl. No.: 463,273

[22] Filed: Feb. 2, 1983

[51] Int. Cl.³ .............................................. E04B 1/347
[52] U.S. Cl. ......................................... 52/3; 160/218; 52/63
[58] Field of Search ........................................ 52/3–5, 52/537, 543, 630; 160/218, DIG. 8, 352

[56] References Cited

U.S. PATENT DOCUMENTS

| | | |
|---|---|---|
| 265,003 | 9/1882 | Bean . |
| 637,159 | 11/1899 | Rayl . |
| 989,624 | 4/1911 | Martin ............................ 52/543 |
| 1,103,793 | 7/1914 | Martin ............................ 52/537 |
| 1,114,755 | 10/1914 | Hansen ............................ 52/5 |
| 2,117,092 | 5/1938 | Guiterman ....................... 52/630 |
| 2,193,469 | 3/1940 | Ashton ........................ 160/DIG. 8 |
| 2,369,487 | 2/1945 | Ochiltree ......................... 52/630 |
| 2,635,562 | 4/1953 | Abramson . |
| 2,876,715 | 3/1959 | Banks . |
| 3,327,434 | 6/1967 | Martin ............................ 52/3 |
| 4,041,654 | 8/1977 | Nedila ............................ 52/3 |
| 4,248,343 | 2/1981 | Schaefer ......................... 52/4 |

Primary Examiner—James L. Ridgill, Jr.
Attorney, Agent, or Firm—Harvey B. Jacobson

[57] ABSTRACT

A hay bale cover for use with large cylindrical hay bales stored outdoors for protecting such bales from inclement weather such as rain, snow, hail and the like. The cover is in the form of an arcuate panel of flexible resilient material having a plurality of longitudinally extending, parallel ribs formed therein which extend from end to end of the panel to provide longitudinal rigidity but enabling the side edges of the panel to be flexed to vary the radius of curvature of the panel. The end edges of the panel each have an inwardly extending flange with radial corrugations therein. This enables the cover to be positioned on top of a cylindrical hay bale which is positioned horizontally on the ground surface or the like and forced downwardly thereon so that the side edges are capable of flexing outwardly and the inherent spring-like action will then cause the cover to snugly fit and actually cling to the hay bale, thereby eliminating the necessity of using tie-downs.

7 Claims, 5 Drawing Figures

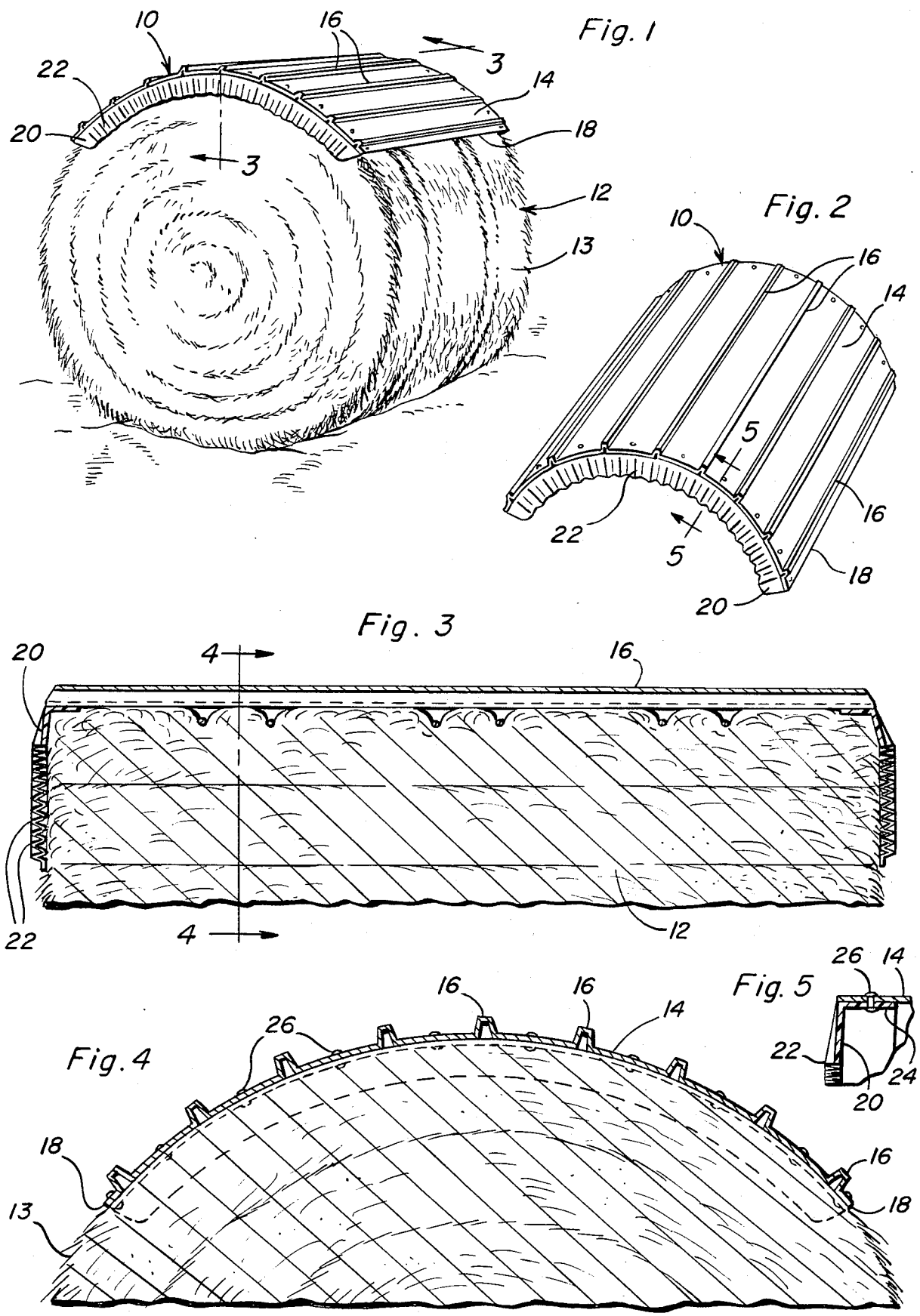

HAY BALE COVER

BACKGROUND OF THE INVENTION

1. Field of the Invention

The present invention generally relates to a protective cover for large round hay bales which are produced by present day hay baling equipment while such bales are positioned outdoors with the bales oriented endwise on the ground surface or other supporting surface. The cover is in the form of an arcuate panel positioned on the cylindrical surface of the hay bale and covering the upper portion thereof and being constructed to snugly fit and cling to the hay bale thereby eliminating the necessity of using tie-downs to retain the cover in place on the hay bale.

2. Description of the Prior art

Haystacks and hay bales frequently are stored outdoors where they are subject to adverse affects of inclement weather. In order to protect hay stored outdoors, various structures have been provided to protect the hay bales or stacks. The following U.S. patents are exemplary of the efforts which have been made to provide covers for hay bales, haystacks and the like:

U.S. Pat. No. 265,003; Sept. 26, 1882
U.S. Pat. No. 637,159; Nov. 14, 1899
U.S. Pat. No. 2,635,562; Apr. 21, 1953
U.S. Pat. No. 2,876,715; Mar. 10, 1959
U.S. Pat. No. 3,327,434; June 27, 1967
U.S. Pat. No. 4,041,654; Aug. 16, 1977

SUMMARY OF THE INVENTION

An object of the present invention is to provide a hay bale cover in the form of an arcuate panel adapted to cover the top portion of the cylindrical surface of a round hay bale when lying endwise on a support surface to protect the hay bale from inclement weather such as rain, snow, hail and the like.

Another object of the invention is to provide a hay bale cover in accordance with the preceding object in which the arcuate panel is constructed with flexible, resilient characteristics to enable the side edges of the panel to be flexed outwardly to fit down over and around a portion of the cylindrical surface to snugly fit and cling to the hay bale thereby eliminating the necessity of using tie-downs to retain the cover in position on the hay bale.

A further object of the invention is to provide a hay bale cover in accordance with the preceding objects in which the arcuate panel is provided with end flanges with the end flanges having radial corrugations therein to provide flexibility to the arcuate panel and to provide a spring or resilient action thereto so that the side edges of the panel can be moved apart and the resiliency of the panel and end flanges will bias the edges of the panel into snug clinging engagement with the hay bale.

Still another object of the invention is to provide a hay bale cover in accordance with the preceding objects in which the arcuate panel is provided with a plurality of longitudinally extending ribs throughout the length thereof to rigidify the panel longitudinally and enable flexing to vary the radius of curvature with the ribs being positioned so that the two remote side edges of the panel have a rib position closely adjacent thereto.

Yet another important object of the present invention is to provide a hay bale cover in accordance with the preceding objects which is simple in construction, easy to install, effective for protecting the hay bale, and does not require the use of extraneous tie-downs or other structure for retaining the cover in position on the hay bale.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the hay bale cover of the present invention installed on a hay bale.

FIG. 2 is a perspective view of the hay bale cover removed from the hay bale illustrating the radius of curvature of the cover when disassociated from the hay bale.

FIG. 3 is a longitudinal, vertical sectional view taken substantially upon a plane passing along section line 3—3 of FIG. 1 illustrating further structural details of the hay bale cover and the relationship of the end flanges to the hay bale.

FIG. 4 is a transverse, sectional view taken substantially upon a plane passing along section line 4—4 of FIG. 3 illustrating further structural details of the hay bale cover including the ribs formed therein.

FIG. 5 is a fragmental sectional view taken substantially upon a plane passing along section line 5—5 of FIG. 2 illustrating the manner in which the end flanges are attached to the arcuate panel of the hay bale cover.

DESCRIPTION OF THE PREFERRED EMBODIMENT

Referring now specifically to the drawings, the hay bale cover of the present invention is generally designated by reference numeral 10 and is illustrated in association with a conventional cylindrical hay bale 12 when positioned lengthwise on a supporting surface such as the ground surface or the like. Hay bale 12 is that type which is produced by present day hay baling equipment and is a large cylindrical bale which frequently is left stored out of doors and is subjected to environmental conditions such as inclement weather including rain, hail, sleet, snow and the like. The cover 10 is positioned in overlying and protective relationship to a portion of the cylindrical surface 13 of the hay bale 12 and extends from end to end thereof as illustrated in FIGS. 3 and 4.

The hay bale cover 12 includes an elongated arcuate panel 14 having a plurality of parallel, outwardly extending ribs 16 extending from end to end thereof in which the ribs are integral with the panel and are generally rectangular in cross-sectional configuration although the sidewalls thereof may diverge downwardly and inwardly as illustrated in FIG. 5 with the ribs 16 defining a plurality of longitudinally extending, inwardly opening channels. As illustrated, the ribs 16 are continuous and form a part of the panel 16 with two of the ribs 16 being positioned adjacent the side edges 18 of the panel 14 with the ribs being equally spaced from each other. The number of ribs 16 may vary depending upon the distance between the side edges 18 with the ribs 16 being equally spaced and providing rigidity lengthwise of the panel 14 but enabling arcuate flexing of the panel 14 to vary the radius of curvature of the panel 14 from that illustrated in FIG. 2 to that illustrated in FIG. 1 when the cover 10 is installed on the hay bale 12.

Each end of the panel 14 is provided with an inwardly extending end flange 20 which is radially corrugated with the corrugations being designated by numeral 22. The flange 20 may be integral with the panel 14 or secured thereto by an inwardly extending flange 24 at the outer edge of the flange 20 and rivets or other fastening elements 26 extending through the flange 24 and the panel 14 adjacent the end edges thereof as illustrated in FIG. 5. The corrugations 22 in the end flanges 20 enable the panel 14 to be flexed outwardly and increases the resiliency or spring action of the panel 14 so that it will snugly fit and cling to the cylindrical surface 14 of the hay bale 12 with the end flanges 20 positioned along the end surfaces of the hay bale 12 to prevent wind and rain from entering between the cover 10 and the hay bale 12. The construction of the cover 10 enables it to be positioned onto the top surface of a hay bale 12 with the cover 10 arcuately curved in a shorter radius than the radius of the cylindrical surface 13 of the hay bale 12. The cover 10 than may be forced downwardly which will cause the side edges 18 of the panel 14 to move apart and the corrugations 22 in the flange 20 to be stretched outwardly from their normal condition so that when the panel 14 reaches a radius of curvature conforming with the external surface of the hay bale 12, the spring action or resiliency of the panel 14, ribs 16, corrugation 22 and end flanges 20 will bias the side edges 18 toward each other thereby snugly engaging the hay bale 12 and actually clinging to the hay bale 12 which eliminates the necessity of using tie-downs to retain the cover in place on the hay bale 12. The end flanges 20 prevent wind from entering between the hay bale 12 and the cover 10 thereby further eliminating the necessity of tie-downs to retain the cover 10 in place.

The cover 10 may be constructed of sheet metal, plastic or the like and may be of one-piece unitary construction or may be of assembled construction as illustrated. As indicated, the dimensional characteristics of the cover may vary with the length thereof generally conforming with the length of the hay bale and the flanges 20 being generally on the order of 5 inches in width and provided with 1 inch corrugations 22. The ribs 16 may be approximately 2 inches high and the construction of the cover is such that the side edges 18 may move apart approximately 8 inches when installed on the hay bale. The cover does not extend around one-half of the hay bale but does protect the uppermost portion thereof and sheds water toward the outermost portions of the cylindrical surface so that any water which drips from the side edges of the cover will be deflected outwardly by the surface of the cylindrical hay bale thereby reducing penetration of moisture into the hay bale and reducing the adverse affects of inclement weather on hay bales stored outdoors. When it is desired to use the hay bale, the cover may be easily removed by merely lifting upwardly on the side edges thereof.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A cover on a cylindrical hay bale with a preselected radius of curvature, wherein the cover comprises a longitudinally straight and transversely arcuate panel formed with a predetermined radius of curvature less than said preselected radius and overlying a portion of the cylindrical surface of said hay bale, said panel being constructed with longitudinal rigidity and arcuate flexibility to enable the normal radius of curvature of the panel to be increased and fitting snugly onto the hay bale, said panel including resilient characteristics to grippingly engage and cling to the hay bale when the radius of curvature has been increased from normal and then released to enable the cover to be mounted on the hay bale and retained thereon solely by frictional gripping engagement and without tie-downs.

2. The structure as defined in claim 1 together with an end flange on each end of the panel for positioning adjacent the end surfaces of a cylindrical hay bale.

3. The structure as defined in claim 2 wherein said end flanges each have a plurality of radially extending corrugations therein with the end flanges and arcuate panel being constructed of resilient material with the radial corrugations in the flanges increasing the spring action provided by the resilient characteristics of the panel and end flanges to enable the side edges of the arcuate panel to move apart to conform with the cylindrical surface of a hay bale as the panel is pushed downwardly onto the hay bale thereby frictionally gripping the hay bale to retain the cover on the hay bale without tie-downs.

4. The structure as defined in claim 3 wherein said arcuate panel is provided with a plurality of longitudinally extending, parallel, equally-spaced ribs formed therein with the ribs projecting outwardly from the panel and of unitary construction therewith to define a plurality of inwardly opening channels to provide arcuate flexibility to the panel and resilient characteristics thereto.

5. The structure as defined in claim 3 wherein said arcuate panel and end flanges are integrally associated with each other with the end flanges increasing the rigidity of the arcuate panel and increasing the resilient spring action thereof.

6. In combination, a cylindrical hay bale supported on a supporting surface on its cylindrical surface, a protective cover for the hay bale to protect the upper portion of the cylindrical surface such as from inclement weather conditions such as rain, sleet, hail and snow, said cover comprising an arcuate panel constructed of material having resilient characteristics with the panel normally having a radius of curvature less than the radius of curvature of the cylindrical hay bale to enable the arcuate panel to be forced downwardly onto the cylindrical hay bale with the side edges thereof being spread apart toward a larger radius for frictional gripping engagement with the hay bale to retain the cover on the hay bale without the use of tie-downs.

7. The combination as defined in claim 6 wherein said arcuate panel is provided with a pair of end flanges rigid therewith, each end flange including radially extending corrugations to enable the end flange to change its radius of curvature by stretching the corrugations to a more shallow accordion folded arrangement to increase the spring action for holding the cover to the hay bale.

* * * * *